United States Patent [19]
Holmes

[11] 4,016,345
[45] Apr. 5, 1977

[54] PROCESS FOR POLYMERIZING TETRAFLUOROETHYLENE IN AQUEOUS DISPERSION

[75] Inventor: David Alan Holmes, Vienna, W. Va.

[73] Assignee: E. I. Du Pont de Nemours and Company, Wilmington, Del.

[22] Filed: Mar. 24, 1976

[21] Appl. No.: 670,075

Related U.S. Application Data

[63] Continuation-in-part of Ser. No. 317,804, Dec. 22, 1972, abandoned.

[52] U.S. Cl. ................................ 526/206; 526/255
[51] Int. Cl.$^2$ .......................................... C08F 14/26
[58] Field of Search ................... 526/229, 255, 206

[56] References Cited

UNITED STATES PATENTS

| | | | |
|---|---|---|---|
| 2,393,967 | 2/1946 | Brubaker | 260/92.1 |
| 2,612,484 | 9/1952 | Bankoff | 260/92.1 |
| 2,750,350 | 6/1956 | Kroll | 260/92.1 |
| 3,142,665 | 7/1964 | Cardinal et al. | 260/92.1 |
| 3,752,796 | 8/1973 | Mueller et al. | 526/206 |

*Primary Examiner*—Harry Wong, Jr.

[57] ABSTRACT

Polytetrafluoroethylene resin, coagulated after aqueous dispersion polymerization, having a fibrillatable character that is observable under high magnification and is manifested by high stretchability and long stress relaxation time under given conditions, is obtained by the aqueous dispersion technique, but with the polymerization initiator and its concentration, and the method of charging the initiator to the aqueous polymerization medium, and the temperature of polymerization being controlled to produce the resin. The resin is useful in applications served by earlier polytetrafluoroethylenes that have been coagulated from aqueous dispersion polymerization and is especially useful where processing conditions require shear or stretching.

1 Claim, 9 Drawing Figures

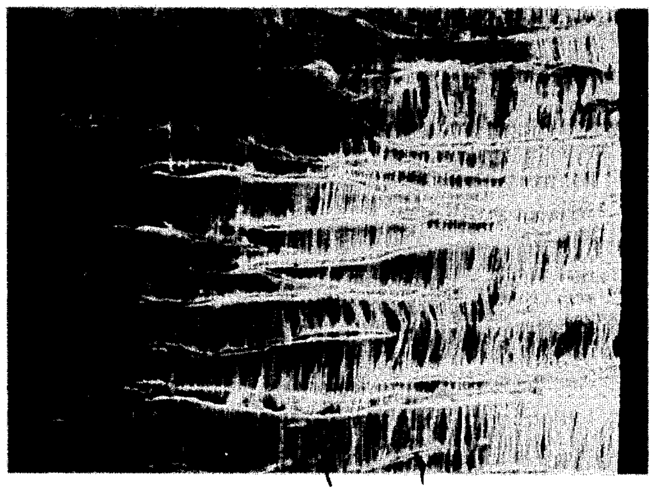
FIG. 7
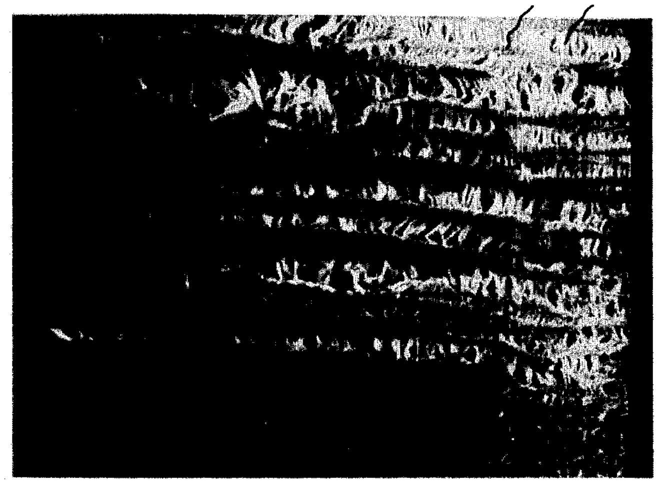
FIG. 8
2
4
FIG. 9

PROCESS FOR POLYMERIZING TETRAFLUOROETHYLENE IN AQUEOUS DISPERSION

CROSS-REFERENCE TO RELATED APPLICATION

This application is a continuation-in-part of copending application Ser. No. 317,804, filed Dec. 22, 1972, now abandoned.

FIELD OF THE INVENTION

This invention relates to polytetrafluoroethylene resins obtained by coagulation from a dispersion of the resin in which the resin was prepared by the aqueous dispersion polymerization method.

BACKGROUND OF THE INVENTION

Polytetrafluoroethylene resin produced by the aqueous dispersion polymerization method is coagulated from the resulting polymerization dispersion medium. It is commonly called "fine powder" resin to distinguish it from the polytetrafluoroethylene resin produced by suspension polymerization (called "granular" resin).

The fine powder resins fibrillate when subjected to shearing during paste extrusion (as described in U.S. Pats. Nos. 2,685,707 and 3,315,020) and during stretching at temperatures below that at which polytetrafluoroethylene sinters, 340° C. (as described in U.S. Pat. No. 3,664,915 and Belgian Pat. No. 767,423).

A process is needed for producing a resin mode by the aqueous dispersion polymerization method which fibrillates in a manner that allows an increased degree of stretching. Such resin is desirable for many applications since the porosity of the finished article is increased and since less resin is needed for the article. This invention provides a process for obtaining such a resin.

SUMMARY OF THE INVENTION

The present invention provides a process for preparing polytetrafluoroethylene resins which comprises a. polymerizing tetrafluoroethylene in an aqueous reaction medium in the presence of a nontelogenic dispersing agent present in an amount sufficient to maintain the polymer particles produced in an dispersed state and in the presence of an inorganic persulfate initiator and at a temperature of between about 95° and about 125° C.; and wherein said initiator is continuously added to the reaction medium during the polymerization until between about 50% and 80% of the total amount of polytetrafluoroethylene to be formed is formed with the total amount of initiator adding being no more than about 0.011 gram per liter of reaction medium, b. followed by coagulating and drying the resin.

DESCRIPTION OF THE DRAWINGS

The fibrillar structure capability of the resins produced by the process of this invention is illustrated in the photographic drawings accompanying this specification, wherein:

In FIG. 1 the stretch ratio of the beading is 5:1;

In FIG. 2 the stretch ratio is 16:1;

In FIG. 3 the stretch ratio is 24:1, and

In FIG. 4 the stretch ratio is 50:1.

FIGS. 5–9 are scanning electronmicrographs at 100X magnification of longitudinal cross sections of beadings of other representative polytetrafluoroethylene fine powder resins as follows:

In FIGS. 5 and 6, the resin is "Teflon" 6A (prior to 1972), manufactured by the Du Pont Company, at stretch ratios of 5:1 and 6:1, respectively.

In FIGS. 7 and 8, the resin is "Fluon" CD-023 (SSG 2.193) and CD-1, manufactured by Imperial Chemical Industries, at stretch ratios of 16:1 and 5:1, respectively.

In FIG. 9 the resin is "Hostaflon" TF VP22, manufactured by Farbwerke Hoechst, at a stretch ratio of 5:1.

All the resins depicted in FIGS. 1–9 were stretched at 300° C. at a constant strain rate of 5.33 cm. per sec., the gage length of the test specimen being 5.08 cm.

DESCRIPTION OF THE INVENTION

In each of the FIGS. 1–9, two kinds of structures are visible: long, narrow, filament-like formations which can be called fibrils 2, and junctions 4 to which the fibrils appear connected at their ends, the junctions 4 appearing more massive than the fibrils 2 in the sense of being much wider than the fibrils. The fibrils 2 extend in the direction of stretch and the junctions 4 have their longer dimension extending in the direction transverse to the length direction of the fibrils. It is believed that the fibrils 2 become stretched in the stretching of the beading while the transverse formations 4 do not become stretched except to the extent of probably supplying resin to the lengthening fibrils.

Figure 1:
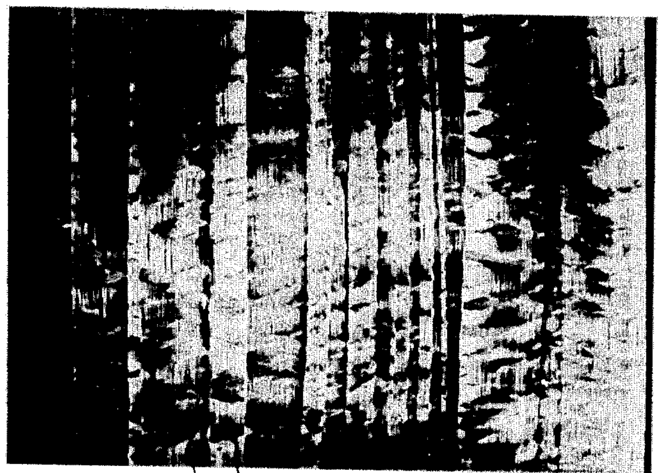
FIGS. 1 to 4 are scanning electronmicrographs at 100X magnification of longitudinal cross sections of beadings prepared from resins made by the process of this invention, which resins have been subjected to different degrees of stretching, as follows.
Figure 2:
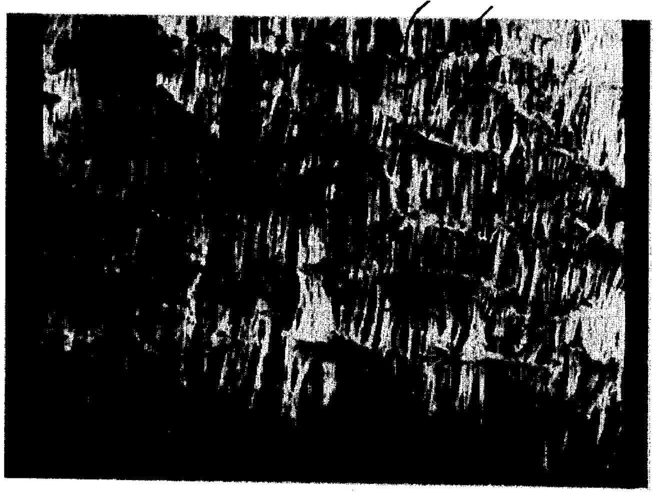
Figure 3:
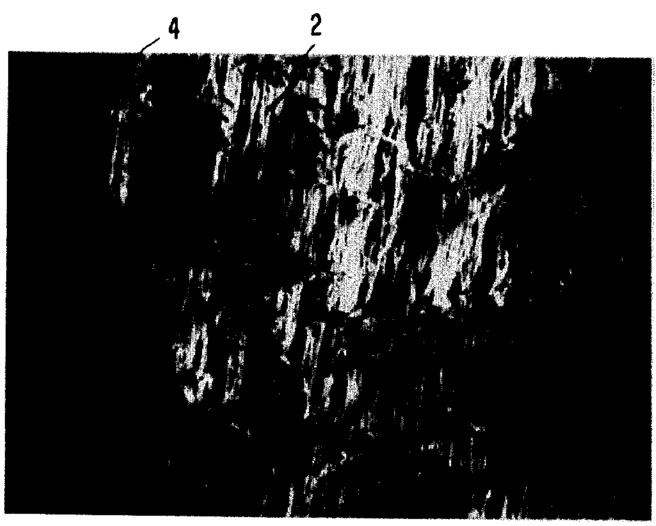
Figure 4:
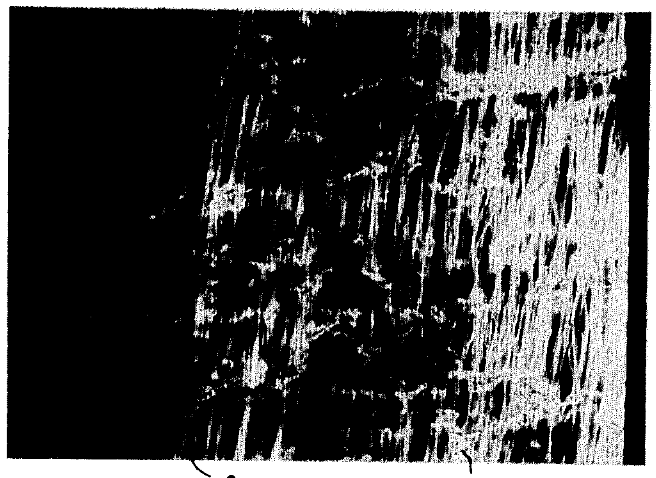

The changes occurring in the fibrillar structures developed in the resins produced by the process of this invention as the strain increases is shown in FIGS. 1–4 which are so numbered in the order of increasing stretch. It is seen that in FIG. 1, at the stretch ratio of 5:1, rows of relatively massive discontinuous junctions 4 interconnected by fibrils 2 are visible. As the beading is stretched further to a stretch ratio of 16:1 in FIG. 2, the fibrils 2 appear longer and the junctions 4 appear to decrease in length and to assume a somewhat more irregular or web-like pattern. Further stretching to the stretch ratio of 24:1 shown in FIG. 3 produced somewhat further lengthening of the fibrils 2 and a further breaking down of the junctions 4 into small irregular, widely scattered units. At the highest stretch ratio shown, 50:1 in FIG. 4, the major change that is visible as compared to FIG. 3 is the presence of the junctions 4 as now being much smaller not only in terms of length, but also in terms of overall weight proportion of junctions present, and being more widely scattered (dispersed) within the "matrix" of fibrils 2.

In summary, the change occurring with increasing stretch in the resins produced by the process of this invention can be described as the comcomitant (a) decrease in proportion of junction phase present as compared to fibril phase and (b) the breaking up and dispersing of the junctions 4. Specifically, the resins produced by the process of this invention have high stretchability as slow draw (strain) rates, i.e., ultimate stretch ratios of at least 30:1, long stress relaxation times, i.e, at least 4 minutes, stretch ratios of at least 24:1, and tensile break strengths of at least 80% of the unstretched tensile break strength. Stretched beadings of the resin have an irregular pattern of junctions connected by fibrils.

In contrast, the typical fibrillation pattern for most earlier fine powder resins of the art is generally for the junctions to remain integral with increasing stretch, rather than rearranging into a web pattern followed by breaking up and dispersing as with the resins produced by the process of this invention, with the lengthening of the beading occurring primarily through lengthening of fibrils, leading to failure of such art resins to attain an ultimate stretch of at least 30:1 and a stress relaxation time of at least 4 minutes.

Figure 5:
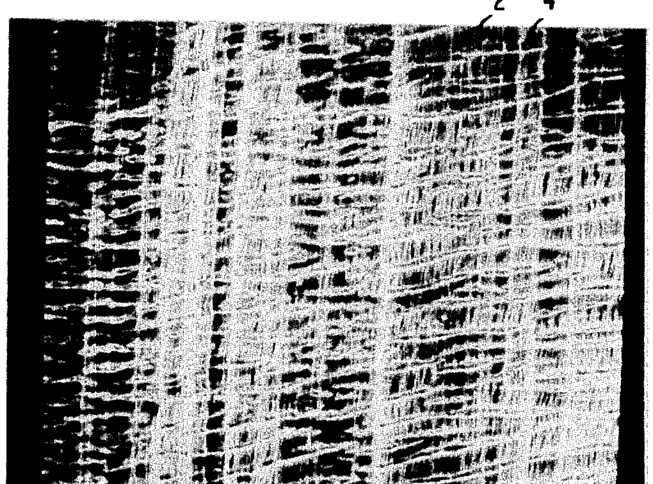
Figure 6:
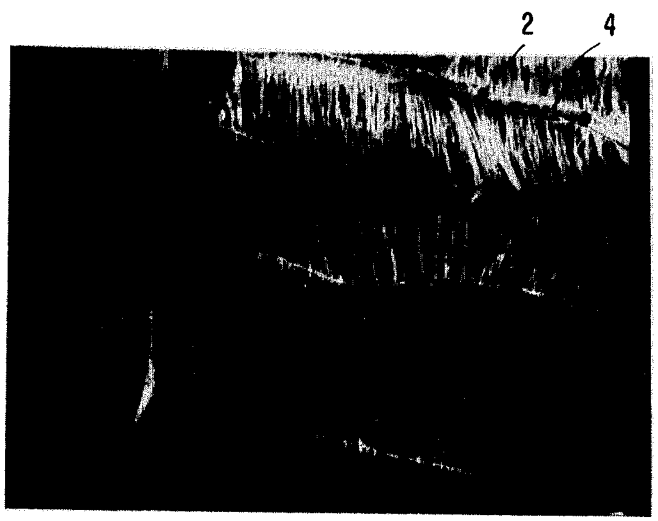

FIGS. 5 and 6 illustrate this typical character wherein for the art resin designated "Teflon" 6A, the structure of fibrils 2 connected to transversely extending junctions 4 is visible in FIG. 5 at a stretch ratio of 5:1. In FIG. 6, at a stretch ratio of 16:1, the junctions 4 appear as rows of solid unbroken (integral) material spaced along the length of the beading, with the lengthened fibrils 2 forming interconnections between the rows.

A similar arrangement appears in FIG. 7 for the art resin designated "Fluon" CD-023 at a stretch ratio of 16:1. The difference in structure between FIG. 6 and FIG. 7 is that the FIG. 6 structure is closer to failure in having a tensile break strength with is less than 50% of the tensile break strength of the beading prior to stretching. The FIG. 7 structure is also deficient, however, in that it breaks when stretched further to a stretch ratio of 24:1. Comparison of the FIG. 7 structure with that of the resin produced by the process of this invention depicted in FIG. 2 which is at the same stretch ratio of 16:1 shows the shortening and irregular disposition of the junctions 4 in FIG. 2.

The art resins depicted in FIGS. 8 and 9 appear characterized by even more massive junctions 4 at the stretch ratio of 5:1 shown, and these art resins have even poorer stretchability, failing even to attain a stretch ratio of 16:1.

STRETCH RATIO AND ULTIMATE STRETCH RATIO TEST

The property of stretchability of polytetrafluoroethylene resins produced by the aqueous dispersion polymerization method is manifested at temperatures below the sintering temperature of the polytetrafluoroethylene. The increased stretchability is characterized in terms of ultimate stretch ratio and of stretch ratio. Ultimate stretch ratio is the ratio of stretched length at breaking of the test specimen of the fine powder to unstretched length. Stretch ratio is the weight per unit of length of the test specimen prior to stretching as compared to the weight per the same unit of length after stretching.

The procedure for determining ultimate stretch ratio and stretch ratio as described herein is as follows:

Preparation of Test Specimen —The sample of resin to be stretched is paste extruded by a procedure disclosed hereinafter into beading through an orifice 0.318 cm. in dia. This beading is tested for uniformity by tensile testing 3 representative samples (gage length 11.43 cm.) along the length of the beading at 25° C. and a strain rate of 30.5 cm. per sec. The beading is considered uniform if the range of tensile break loads so obtained is within ± 5% of the average tensile break load. The beading used further to determine stetchability satisfies this criterion of uniformity. The average tensile break value obtained in determining beading uniformity is also taken as the tensile break strength of the unstretched beading. The uniform beading is cut into 8.9 cm. lengths, such length being the length of the specimens tested further.

Stretch Procedure — The test specimen is clamped at each end leaving a space of 5.08 cm. between clamps (gage length), with the clamps being part of apparatus which moves the clamps apart at a constant speed of 5.33 cm. per sec. The clamped beading is placed in a circulating air oven operating at 300° C. and the stretching is done at this temperature to the distance corresponding to the stretch ratio desired (ratio of weight per unit length to weight after stretching for the same unit of length) at the constant rate indicated. After stretching, the specimen is examined while still clamped to see if the stretch is uniform along the length of the specimen, excluding some possible neck-down in the region of the clamps. In this regard, ink markings made on the specimen prior to stretching under the region of clamping should not be visible as this would indicate slippage from the clamp rather than stretching, and an ink center marking on the specimen prior to stretching should be within 12.5% of the center after stretching.

For determination of ultimate stretch ratio, a recording load cell is connected to a high speed chart that records the stress-time curve during stretching at the 5.33 cm. per sec. rate at 300° C. in accordance with the Stretch Procedure. When the load reaches zero (either by direct measurement or by extrapolation of the predominant negative slope of the stress-time curve), the corresponding stretch ratio is taken as the ultimate stretch ratio.

TENSILE BREAK STRENGTH TEST

The tetrafluoroethylene resins produced by the process of this invention, while having the previously described attributes of ultimate stretch ratio and stress relaxation time (described in detail later herein), also have attributes of a stretch ratio of at least 24:1 accompanied by strength in the stretched beading, which strength is characterized by the beading (stretched test specimen) having a tensile break strength which is at least 80% of the tensile break strength of the original unstretched beading which is in turn preferably at least 2.27 kg. The tensile break strength of the stretched test specimen is taken as the minimum tensile break load of three stretched test specimens, one from each stretched end of the specimen (excluding neck-down if any in the region of clamp) and one from the center thereof, the measurement being made at 25° C. at a strain rate of 30.5 cm. per sec. and gage length of 11.43 cm. gripped by 5.08 cm. standard filament jaws, with 1.27 cm. distance between jaws (all tensile testing described herein is done with this gage length).

STRETCHING RATE

The stretchability of the resins produced by the process of the present invention is seen from the fact that this stretchability occurs at the relatively low rate of stretching of 5.33 cm. per sec. Other polytetrafluoroethylene resins produced by the aqueous dispersion method may attain higher stretch ratios but only at much faster stretching rates which have such disadvantages as being difficult to attain mechanically and on an economical basis, especially for such applications as stretching sheeting, and a yield penalty caused by extrudate breakage during equipment start up. Moreover, even when the faster stretching rate is used, the initial velocity of the extrudate in approaching its fully developed value must pass through a slow rate region, again leading to extrudate breakage.

By way of example as to the faster stretching rates necessary for prior art resins produced by the aqueous dispersion method, the aforesaid Belgian Pat. No. 767,423 disclosed in Example 1 Table 1A that stretching rates of 30%, 100%, 1000% and 5000% per sec. all are applicable to stretch a polytetrafluoroethylene aqueous dispersion produced resin designated as "Teflon" 6A (the same resin as illustrated in FIGS. 5 and 6 hereof) to a degree of stretch of 200% which is the same as a stretch ratio of 2:1 (stretch rates given in percentages refer to a constant strain rate which corresponds to a doubling of the gage length of the test specimen in the first second of strain). However, in Table 1B of said patent, where the stretching is done to a greater degree, i.e., 550% (5:5:1) all the test specimens broke at the slowest stretch rate of 30% per sec. As the stretching was done to even a greater degree, 1500% (15:1) in TAble 1C of the patent, all the specimens broke at both the 30% and 100% per sec. stretch rates at all temperatures of stretch, and even at the 1000% and 5000% per sec. stretch rates at 200° F. (94° C.) and 400° F. (205° C.) stretch temperatures. Example 2 of the aforesaid Belgian Patent shows how extremely high a strain rate is required to stretch another aqueous dispersion resin designated as "Teflon" 6C, wherein for a degree of stretch of only 550%, stretch rates of 5000% and 10,000% per sec. cause breaking of the test specimen and the rate of 40,000% per sec. is required to avoid breaking at the stretch temperature of 205° and 315° C.

In contrast, the 5.33 cm. per sec. stretch rate reference point used for the resins of the present invention corresponds to a percent stretch rate of only about 100% per sec., and at this low rate, an ultimate stretch ratio of at least 30:1 and preferably at least 50:1 is attainable.

STRESS RELAXATION TIME

Another unique property possessed by the polytetrafluoroethylene aqueous dispersion resins produced by the process of the present invention is a stress relaxation time of at least 4 minutes. The property of stress relaxation time is the length of time it takes for the previously described test specimen to break when heated at 395° C. in a fully extended condition after stretching to a ratio of 24:1 at 300° C. and at a strain rate of 38.1 cm. per sec. with an initial length of 5.08 cm. between the clamps (test 12.7 cm. length of stretched beading in this test). The resins resist breaking in the molten state under which this test is conducted for at least 4 minutes and many times for at least 5.5 minutes as compared to a maximum of 3 minutes for the prior art resin "Fluon" *CD*-023 (SSG of 2.175), which prior art resin comes close to the resins produced by the process of the present invention in stress relaxation time, many other prior art resins tested having a considerably lower stress relaxation time. Even this closest prior art resin has a tensile break strength for beading stretched to a ratio of 24:1 which is less than 40% of the tensile break strength of the unstretched beading. The heating at 395° C. in this test is done in a circulating air oven operating at that temperature, but for a short period of time when the stretched test specimen is placed into the oven, the temperature drops somewhat, e.g., to about 365° C. and it takes about one to two minutes for the oven to return to 395° C. The stress relaxation time is the time starting from placement of the test specimen into the oven.

One significance of the improved stress relaxation time exhibited by the resins produced by the process of the present invention is that stretched articles made from them can be sintered (heat to a temperature greater than 340° C. to cause partial coalescence of the polytetrafluoroethylene particles in the stretched article while retaining the major amount of porosity of the article) in a continuous inline operation with greater assurance of feedom from breaking, which would cause shutdown of the operation.

STANDARD SPECIFIC GRAVITY (SSG)

Another property that is significant in combination with the increased fabrillatability of the resins produced by the process of the present invention is molecular weight. Molecular weight of polytetrafluoroethylene resins is so high, i.e., greater than one million, that it is usually measured indirectly by a procedure which gives the standard specific gravity (SSG) of the resin. Standard specific gravity is determined by the procedure described in U.S. Pat. No. 3,142,665 except that 12 gram, instead of 3.5 g., void-free chips of the same diameter were empolyed. The standard specific gravity of the resin varies inversely with the molecular weight; as the molecular weight increases, the numerical value of the standard specific gravity decreases. In order for the resins produced by the process of this invention to achieve desirable properties of stretchability and stress relaxation, it is believed that the resin should have an SSG of no greater than 2.210.

POLYMERIZATION PROCEDURES

In the process of this invention, polytetrafluoroethylene resins having the properties described above are made by the aqueous dispersion procedure. More specifically, tetrafluoroethylene is stirred in an aqueous medium in the presence of dissolved persulfate polymerization initiator and dispersing agent, under tetrafluoroethylene pressure of 10 to 40 kg./cm$^2$, until the percent of colloidal dispersed polymer particles desired is reached and then the polymerization reaction is stopped. Within this general procedure, however, such parameters as polymerization temperature and initiator and its concentration and manner of addition are controlled to produce the particular resins.

The polymerization reaction is carried out at 95° to 125° C., and the polymerization initiator is added to the reaction medium throughout the polymerization reaction until between about 50 to about 80%, preferably 50–70%, of the total amount of polytetrafluoroethylene to be formed has been formed. No polymerization initiator is added during the terminal portion of the reactions, i.e., after 80% is formed. Since the polymerization rate slows down when initiator feed is stopped, the time of stopping will be indicated by the properties desired for the fine powder product, the particular initiator being used and the polymerization temperature. The resins made by this procedure preferably have an SSG of from 2.172 to 2.000 and more preferably 2.177 to 2.190.

It is not desirable to add the initiator all at the beginning of the reaction since then the reaction rate is difficult to control.

The nontelogenic dispersing agent used will generally be fluorinated carboxylic acid or carboxylate such as ammonium polyfluorocarboxylate (preferably the perfluorocarboxylate) containing from 7 to 10 carbon atoms and the amount used is generally from 0.05 to 1.0% based on the weight of water in the polymerization medium. The initiators are the inorganic persulfates such as ammonium persulfate and potassium persulfate.

By programming the addition of initiator, the reaction rate can be controlled, and higher reaction temperatures employed. By using higher reaction temperatures and less initiator, at any given moment, less coagulum develops. Coagulum, as is known in the art, causes premature precipitation of the dispersed polymer particles. The resins are obtained from the foregoing described polymerization procedures as an aqueous dispersion of polytetrafluoroethylene particles having a diameter generally within the range of 0.01 to 0.5 micron and an average particle diameter (raw dispersion particle size) of from 0.15 to 0.40 micron. Average particle diameter is measured by the light scattering procedure disclosed in U.S. Pat. No. 3,391,099 using a refractive index increment of 0.020 cc. per gm. The percent solids (polytetrafluoroethylene particles) in the dispersion is generally from 15 to 50 percent based on the total weight of the dispersion.

The resins are homopolymers of tetrafluoroethylene as distinguished from the modified (small proportion of comonomer) homopolymers disclosed in U.S. Pat. No. 3,142,665, which exhibit poorer stretch ratio and ultimate stretch ratio than that of the resins prepared by the process of this invention.

The resins are obtained by coagulating the as polymerized aqueous dispersion. The coagulation is ordinarily carried out by the following procedure: The aqueous dispersion is diluted, brought to a pH of 8 to 9 by addition of ammonium hydroxide, and coagulated by the procedure of Example 2 of U.S. Pat. 2,593,583, except that the coagulation temperature is 72° F. (22° C.) and the resin is stirred 7 minutes after the time when the dispersion becomes a jelly-like mass. The resin is separated and dried for 16 hours at 150° C. Coagulation has the effect of agglomerating the dispersed particles of polytetrafluoroethylene to agglomerate diameters of about 450 microns in which the individual particles are still detectable by scanning electron microscope.

PASTE EXTRUSION INTO BEADING FOR TEST SPECIMENS

The dried resin is paste extruded into beading which is used in the tensile testing, stretching procedures, and stress relaxation testing described herein by the following procedure: 200 g. of dry resin are placed in a cylindrical glass jar about 9.24 cm. in diameter and blended with 43.5 grams of ARCO Odorless Solvent, a commercially available kerosene-type hydrocarbon lubricant having a boiling point of from 177°–208° C. and a viscosity of 1.75 c.s. at 25° C. The jar and contents are rolled for 20 minutes at 30 rpm to effect blending, and then placed in a water bath maintained at 30° C. for 2 hours for conditioning. The lubricated resin is then pressed at about 3.5 kg./cm.$^2$ gage pressure into a cylindrically shaped preform 2.86 cm. in diameter and about 26 cm. in height. The perform is placed into the cylinder of a paste extruder, the cylinder being of 3.18 cm. diameter The extruder terminates in a conical surface having an apex angle of 30° and leading to an orifice having a uniform diameter of 0.318 cm. and a land length of 2.54 cm. The reduction ratio of the die is 100:1. Water from a thermostated bath maintained at 30° C. is circulated around the cylinder and die to hold the extrusion temperature constant. A ram is advanced along the cylinder at a rate which extrudes 19.0 ± 1.0 grams of polymer (lubricant-free basis) per minute. The extrusion pressure is the pressure developed in the ram face in contact with the sample and this pressure is recorded as a function of time. The average steady-state pressure required to extrude the sample during the entire fourth minute, as measured from the time of first emergence of extrudate from the die, is determined, and this is taken as the extrusion pressure.

The resins produced by the process of the present invention are useful in applications where prior art resins produced by the aqueous dispersion method have been used, with their increased fibrillatability providing special property advantages as hereinbefore described. The increased fibrillatable character can also manifest itself when subject to shear as occurs in blending with other materials, e.g., as disclosed in British Pat. No. 1,045,059.

Examples of the present invention are disclosed hereinafter; parts and percents are by weight unless otherwise indicated. In these examples, substantially the following general polymerization procedure was used unless otherwise indicated:

A horizontally disposed, water/steam jacketed, cylindrical stainless steel autoclave located in a barricade and having a capacity of 36,250 cc. and a length-to-diameter ratio of about 1.5 to 1, and provided with a 4-bladed cage-type agitator capable of being rotated at 46 rpm and running the length of the autoclave, evacuated, and then charged with 855 grams of paraffin wax, 21.8 kg of demineralized water, and 30 grams of ammonium perfluorocaprylate (C-8 APFC) dispersing agent. The autoclave was then heated to the designated temperature with stirring. Initiator solution addition was begun after pressure up. Addition of initiator was at a continuous uniform rate and was stopped within the period in which about 50 to 80 weight percent of the total polytetrafluoroethylene being formed was formed. At the beginning of the polymerization, the autoclave was pressured over a period of about 2 minutes to 26.7 kg./cm.$^2$ absolute with tetrafluoroethylene. Stirring rate and temperature were maintained until kickoff occurred as evidenced by a 0.7 kg./cm.$^2$ drop in pressure, and the time from the start of the pressure up to the kickoff was recorded. Additional tetrafluoroethylene was then added to raise the reaction pressure to 28.1 kg./cm.$^2$ and to maintain the reaction pressure constant until a dispersion of approximately 35 percent solids content (total polymer plus aqueous medium basis) was obtained. The temperature was maintained at the same value throughout the polymerization. After 10,050 grams of tetrafluoroethylene had been fed after kickoff, the monomer feed to the autoclave was terminated, and the pressure was allowed to decrease to 12.3 kg./cm.$^2$ before agitation was stopped and the vapor space of the reactor was vented. The polymerization time is the time from kickoff to the time when the agitator was turned off. The resulting dispersion was discharged and cooled.

EXAMPLES 1 4 and Comparison A

In these experiments, the initiator used was ammonium persulfate and it was pumped continuously into the autoclave as an aqueous solution of 0.165 gms./liter of water, stopping when about 5.45 kg. of the 11 kg. of polytetrafluoroethylene being formed had formed; except that for Example 3, the initiator feed was stopped when 7.25 kg. of polytetrafluoroethylene had been formed. In Comparison A, the initiator feed was added throughout the polymerization reaction until the tetrafluoroethylene feed to the autoclave was stopped. Further details of these experiments and results are given in the following table.

TABLE I.

| Example | Total[1] Amt. Initiator Added-gm. | Polymerization Conditions Temp. °C | Time (min.) | % Solids | SSG | Results Max.[2] Stretch Ratio | Tensile Break Strength-kg. Initial | at Max. Stretch Ratio | Stress Relaxation Time (Min.:Sec) |
|---|---|---|---|---|---|---|---|---|---|
| 1 | 0.11 | 101 | 60 | 34.1 | 2.186 | 34:1 | 3.2 | 3.2 | 6:54 |
| 2 | 0.25 | 120 | 190 | 25.0 | 2.195 | 31:1 | 4.8 | 3.5 | 5:57 |
| 3 | 0.19 | 100 | 105 | 36.7 | 2.172 | 31:1 | 3.7 | 3.9 | 7:44 |
| 4 | 0.22 | 100 | 178 | 35.1 | 2.173 | 31:1 | 3.8 | 4.0 | 7:44 |
| Comparison A | 0.14 | 98 | 119 | 36.4 | 2.188 | 15:1 | 2.8 | 3.0 | 5:37 |

[1]Initiator solution was added to the autoclave at the rates of 20 ml/min for Examples 1 and 4, 16 ml/min for Example 2, 15 ml/min for Example 3 and 10 ml/min reduced to 5 ml/min when 5.45 kg of PTFE had been formed in Comparison A.

[2]Maximum stretch ratio in increments of about eight at which stretched beading had a tensile break strength of at least 80% of that of the unstretched beading.

The resin of Comparison A did not attain the stretch ratio of at least 24:1.

Example 5

The procedure of Example 1 was repeated except that the initiator was added at a slightly slower rate (15 ml. of solution per min. to a total of 0.11 g. APS initiator) to get the same amount of initiator added, with the polymerization time being 127 min. at 99° C. to a polytetrafluoroethylene solids concentration of 39.9% by wt. The resin had an SSG of 2.199, a maximum stretch ratio of at least 51:1, a tensile break strength at that stretch ratio of 3.0 kg. as compared to 3.5 kg. for the unstretched beading. Stress relaxation time was 8.5 minutes.

By way of comparison, the procedure of Example 1 was repeat except that the initiator concentration fed to the polymerization reaction was increased to 0.33 g. APS per 1.3 liters of water and the total amount of initiator added was 0.55 gm. The polymerization temperature was 100° C., polymerization time was 69 minutes, and PTFE solids concentration was 34.2% by wt. The resultaant fine powder had an SSG of 2.224 and a maximum stretch ratio of less than 5:1.

EXAMPLES 6–12

The procedure of Example 1 was followed except as shown in the following Table II.

Properties of the resins obtained are set forth in Table III.

TABLE II

| Ex. | Initiator (conc Ml/Min.)[1] | Temp. °C | Time (Min.) | % Solids | Initiator Addition |
|---|---|---|---|---|---|
| 6 | APS 0.0739 | 100 | 67 | 35.8 | 15 ml/min. until 61.3% TFE reacted, then none |
| 7 | APS 0.0840 | 125 | 203 | 32.4 | 15 ml/min. until 61.3% TFE reacted, then none |
| 8 | KPS 0.0677 | 100 | 91 | 35.1 | 15 ml/min. until 61.3% TFE reacted, then none |
| 9 | APS 0.0570 | 100 | 101 | 33.2 | 15 ml/min. until 69.2% TFE reacted, then none |
| 10 | APS 0.0700 | 100 | 109 | 35.9 | 15 ml/min. until 81% TFE reacted, then none |
| 11 | APS 0.0505 | 100 | 88 | 33.5 | 15 ml/min. until 61.3% TFE reacted, then 5 ml/min. until 67.2% reacted |
| 12 | APS 0.0505 | 100 | 102 | 36.0 | 15 ml/min. until 61.3% TFE reacted, then 5 ml/min. until 81% TFE reacted |

[1]APS = ammonium persulfate
KPS = potassium persulfate

Table III

| Ex. | SSG | Maximum Stretch Ratio | Tensile Break Stretch-kg. Initial | at Max. Stretch Ratio | Stress Relaxation Time (Min.:Sec.) |
|---|---|---|---|---|---|
| 6 | 2.178 | 24 | 2.9 | 2.4 | 10:00 |
| 7 | 2.187 | 24 | 2.9 | 3.1 | 5:20 |
| 8 | 2.168 | 24 | 3.1 | 4.4 | 7:02 |
| 9 | 2.175 | 24 | 2.7 | 2.3 | 9:00 |
| 10 | 2.179 | 32 | 2.7 | 4.0 | 8:18 |
| 11 | 2.174 | 24 | 2.7 | 2.8 | 11:52 |
| 12 | 2.173 | 24 | 2.5 | 3.4 | 6:35 |

By comparison, some of the properties of representative prior art resins obtained by previous aqueous dispersion polymerization methods are as follows:

| Resin | SSG | Max. Stretch Ratio[1] | Ultimate Stretch Ratio | Stress Relaxation Time (Min.) |
|---|---|---|---|---|
| "Soreflon" 6-30[2] | 2.178 | 16:1 | 28:1 | 2.0 |
| "Algoflon" DPT[3] | 2.202 | less than 5:1 | — | — |
| "Hostaflon" TF-VP-22[4] | 2.200 | 5:1 | — | — |
| "Fluon" CD-1[5] | 2.210 | 5:1 | — | — |
| "Fluon" CD-023 | 2.175 | 16:1 | — | 3.0 |

-continued

| Resin | SSG | Max. Stretch Ratio[1] | Ultimate Stretch Ratio | Stress Relaxation Time (Min.) |
|---|---|---|---|---|
| "Fluon" CD-023 | 2.193 | 5:1 | 3:1 | 2.5 |
| "Teflon" 6a(Fig. 5) | 2.180-2.210 | 5:1 | Ca.16-:1 | less than 1 to 3 |

[1]Max. stretch ratio at movements of 5:1, 16:1, and 24:1 at which tensile break strength is at least 80% of tensile break strength prior to stretching.
[2]Ugine Kuhlmann
[3]Montecatini-Edison
[4]Farbwerke Hoechst
[5]Imperial Chemical Industries The ultimate stretch ratios for the "Soreflon", "Fluon" and "Teflon" resins in the table can be increased by greatly increasing the stretch rate from the 100% per sec. at which the reported values were obtained. More specifically at the stretch rate of 800% per sec., these resins exhibit ultimate stretch ratios of 113:1, 137:1 and 177:1, respectively.

In making the resins of the present invention, small changes in operating temperature and condition of the autoclave surface may substantially affect both the reaction rate and the SSG of the product. Thus, reproducibility of the product of a particular example may sometime require a change in initiator content within the scope of concentration recited herein.

I claim:

1. Process for preparing polytetrafluoroethylene resin which comprises a. polymerizing tetrafluoroethylene in an aqueous reaction medium in the presence of a nontelogenic dispersing agent which is a fluorinated carboxylic acid or fluorinated carboxylate containing from 7 to 10 carbons atoms and which is present in an amount sufficient to maintain the polymer particles produced in a dispersed state; and in the presence of an inorganic persulfate initiator; and at a temperature of between about 95° and about 125° C; and wherein said initiator is continuously added to the reaction medium during the polymerization until between about 50% and 80% of the total amount of polytetrafluoroethylene to be formed is formed with the total amount of initiator added being no more than about 0.011 gram per liter of reaction medium, b. followed by coagulating and drying the resin.

* * * * *